(12) United States Patent
Li

(10) Patent No.: US 6,450,054 B1
(45) Date of Patent: Sep. 17, 2002

(54) TRANSMISSION MECHANISM

(76) Inventor: Tianfu Li, 1103 Winthrop Dr., Troy, MI (US) 48083

( * ) Notice: Subject to any disclaimer, the term of this patent is extended or adjusted under 35 U.S.C. 154(b) by 0 days.

(21) Appl. No.: 09/756,516

(22) Filed: Jan. 9, 2001

(51) Int. Cl.$^7$ .................................................. F16H 3/08
(52) U.S. Cl. ....................................................... 74/371
(58) Field of Search .................................. 74/371, 372

(56) References Cited

U.S. PATENT DOCUMENTS

| | | | | |
|---|---|---|---|---|
| 849,087 A | * | 4/1907 | Rosenthal | 74/372 |
| 1,496,921 A | * | 6/1924 | Campbell | 74/372 |
| 1,941,963 A | * | 1/1934 | Wise | 74/372 |
| 5,214,974 A | * | 6/1993 | Morbidelli | 74/371 |
| 6,039,666 A | | 3/2000 | Okuda | |
| 6,033,332 A | | 7/2000 | Evans | |
| 6,086,501 A | | 7/2000 | Takatori | |

* cited by examiner

*Primary Examiner*—Dirk Wright
(74) *Attorney, Agent, or Firm*—Frank G. McKenzie

(57) ABSTRACT

A power transmission mechanism includes a cluster gear formed integrally with, or fixed to an input shaft, and an output shaft arranged parallel to the input shaft and rotatably supporting gears in continuous meshing engagement with pinions of the cluster gear. A control bar, coaxial with the output shaft, defines a axial slot interconnected with radial slots on the output shaft. Locking bolts located in the radial slots and guided by a track, alternately move radially into and out of engagement with the selected gear.

18 Claims, 9 Drawing Sheets

TRANSMISSION MECHANISM

BACKGROUND OF THE INVENTION

1. Field of the Invention

This invention relates to the field of transmission kinematics, particularly to multiple speed gear arrangements.

2. Description of the Prior Art

Various techniques are used to produce multiple ratios of the speed of an input shaft and output shaft using gears and pinions, which are in continuous meshing engagement. For example, in a conventional manual transmission, pinions, comprising a cluster gear arrangement fixed to an input shaft, are driveably connected to an internal combustion engine, motor or other power source. The pinions are in continuous meshing engagement with corresponding gears journaled on the outer surface of an output shaft. In such gear arrangements a synchronizer or coupler is located between each adjacent pair of gears, the synchronizer having a hub that is continually fixed to the output shaft and a sleeve moved in opposite axial directions to produce a drive connection between each of the gears and the output shaft in response to movement by the vehicle operator of a gear selector mechanism.

Various automatic transmissions produce a speed ratio between the input shaft and output shaft through the use of meshing pinion-gear pairs. For example, U.S. Pat. No. 6,033,332 describes a continuously variable transmission, within which two planetary gearsets operate as a power divider and a power combiner.

U.S. Pat. No. 6,086,501 describes a hydro-mechanical transmission having a mechanical power transmitting mechanism employing gears, the gearing including at least one planetary gear mechanism and an output shaft. The control of the gear mechanism includes a hydraulic pump and a hydraulic motor of the variable displacement type. A clutch is located between the output shaft of the motor and the output shaft of the gear mechanism.

U.S. Pat. No. 6,039,666 describes a hydraulic and mechanical transmission in which engine power is divided and transmitted to two output shafts, the first output shaft driving the hydraulic pump of a hydrostatic continuously variable transmission, the second output shaft driving a hydraulic motor through a gear mechanism.

SUMMARY OF THE INVENTION

In a mechanical power transmission providing multiple speed ratios between the input shaft and output shaft using a layshaft or countershaft arrangement, it is preferred that the axial space required for the transmission be minimized, the use of conventional synchronizers, clutches and brakes be eliminated, and the various speed ratios be produced through the cooperative action of a simple, low cost, dependable engagement mechanism, whose position and function are controlled with reference to engine operation parameters and vehicle speed.

In realizing these objects and advantages the transmission mechanism of this invention includes a first shaft having multiple pinions mutually spaced along the shaft and fixed to the shaft for rotation therewith; a second shaft substantially parallel to the first shaft, rotatably supporting mutiple gears thereon, each gear in meshing engagement with a pinion, having a bore extending along the second shaft and multiple radially directed passages spaced mutually along the second shaft, each passage located at the location of a gear; a control bar located in and extending along the bore, supported for movement relative to the second shaft, having an axially directed slot, and a guide rail having an axially directed track, an ascending ramp adjacent the track, and a descending ramp adjacent the ascending ramp; and locking bolts spaced mutually along the second shaft, each locking bolt located in a passage, extending through the axial slot, and retained in the guide rail.

DESCRIPTION OF THE PREFERRED EMBODIMENT

Figure 1:
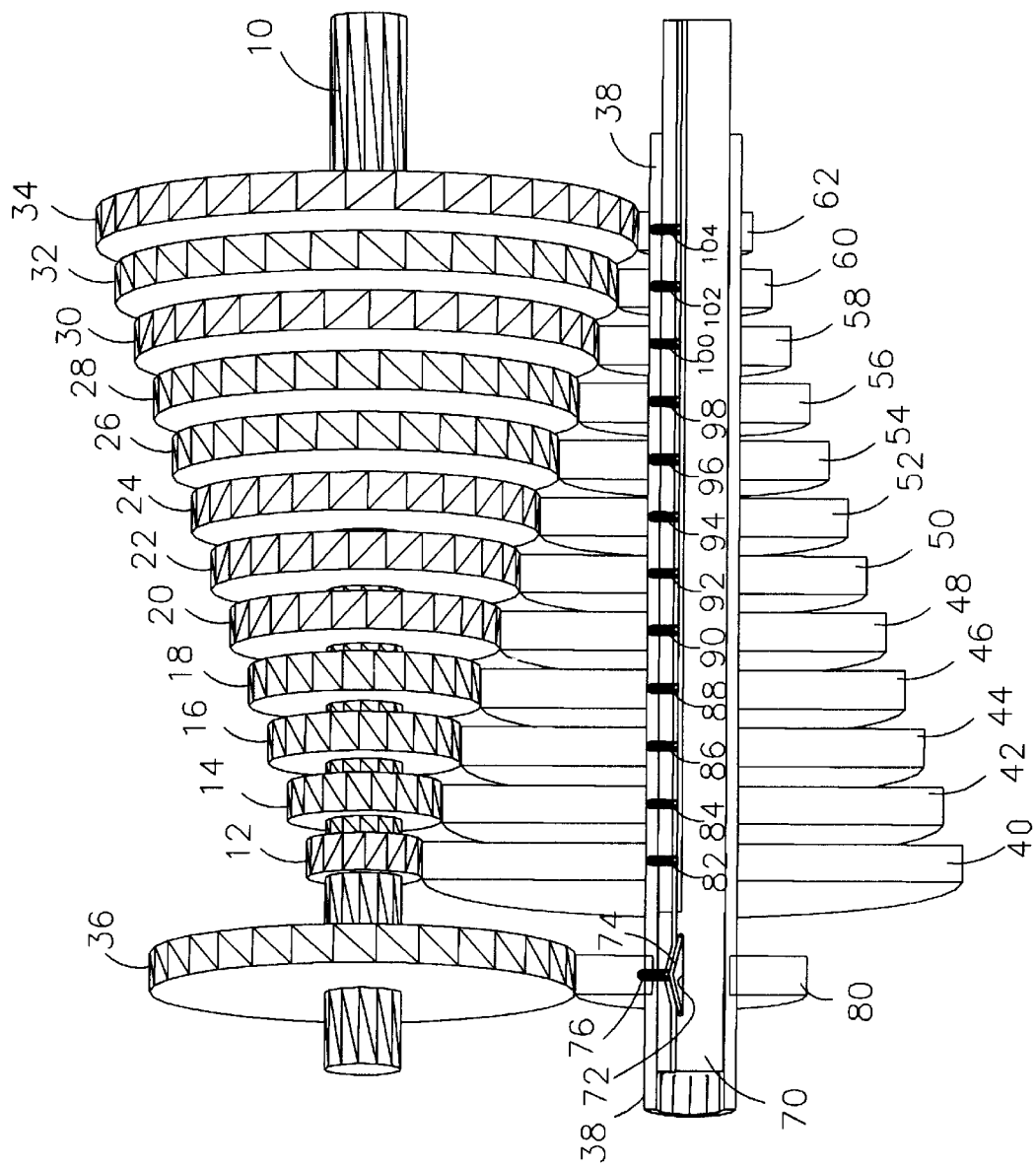
FIG. 1 is an isometric side view, partially in cross section, showing an input shaft cluster gear and output shaft supporting driven gears.

Referring first to FIG. 1, the input shaft 10 of a power transmission mechanism is formed as a cluster gear assembly, on which multiple forward drive pinions 12–34 are either formed integrally with the shaft 10 or are fixed to the shaft for rotation therewith. Also formed on the cluster gear is a reverse drive pinion 36. The cluster gear assembly is rotatably supported on interior surfaces of a gear box (not shown) by bearings supported on the gear box. Input shaft 10 is adapted for a drive connection to the crankshaft of an internal combustion engine, the shaft of an electric motor, or the output of another power source.

A countershaft or output shaft 38 of the transmission mechanism is preferably in the form of a sleeve shaft having an axially directed cylindrical bore formed at its inside diameter. If shaft 38 is a countershaft or layshaft, then preferably an output shaft is arranged coaxially with the input shaft 10, and shaft 38 drives the output shaft though continually engaged gears on countershaft 38 and the output shaft.

Multiple forward drive gears 40–62 are journaled on the outer surface of shaft 38, each gear in continuous meshing engagement with a corresponding pinion of the cluster gear assembly. The various meshing pinion-gear pairs produce ratios of the rotational speed of input shaft 10 to the speed of shaft 38 ranging from a first forward ratio produced by pinion-gear pair 12,40 to a twelfth forward ratio produced by the pinion-gear pair 34,62. In the arrangement of FIG. 1, the transmission is able to produce twelve forward speed ratios and a reverse drive ratio, but the number of forward and reverse ratios can be any suitable number.

Fitted within the bore of sleeve shaft 38 and extending along its axis, is a control bar 70 formed with a local recess 72, within which a plate spring 74 is located, retained, and permitted to deflect elastically. Control bar 70 is also formed with an axial slot 110 adapted to receive each of several locking bolts 82–104, 76 spaced mutually along the axis of shaft 38.

Shaft 38 is formed, at axially spaced locations corresponding to those of each forward drive gear 40–62 and reverse drive gear 80, with multiple radially directed slots 112, each slot sized to receive a locking bolt and to allow the locking bolt to move radially inward and outward. The axial 110 on control bar 70 interconnects with the radial slots 112 on shaft 38. Locking bolts 76, 82–104, each associated with a particular speed ratio, are urged radially outward elastically by the spring plate alternately and selectively through the axial slot 110 on control bar 70 and the corresponding radial slots 112 on shaft 38.

When a locking bolt moves radially outward from the axis of control bar 70, the bolt is brought into blocking contact with a stop surface 116 on the respective gear. That contact prevents the gear from rotating on shaft 38 and produces a drive connection between the selected gear and shaft 38. When a locking bolt moves radially inward toward the axis of the control bar 70, it disengages the respective gear, but remains engaged with the corresponding radial passage 112 on shaft 38. The axial slot 110 on control bar 70 permits the control bar to move axially relative to shaft 38.

Alternately, when a locking bolt moves radially outward from the axis of control bar 70, the radially outer end of the bolt that carries a friction pad or surface, is brought into frictional contact with a similar surface on the corresponding gear. Frictional contact between the gear and locking bolt selective holds the gear against rotation relative to shaft 38 and produces a drive engagement between the gear and shaft 38. When the locking bolt moves radially inward toward the axis of the control bar 70, its frictional contact with the corresponding gear is disengaged, but the locking bolt remains engaged with the corresponding radial passage 112 on shaft 38.

Each locking bolt moves radially through the axial slot 110 on the control bar 70 and the corresponding radial passage 112 on shaft 38 toward and away from the associated adjacent gear 80, 40–62 in response to axial movement of the control bar. That movement brings the spring plate 74 to the location of a selected pinion-gear pair and the associated locking bolt. In this way, each locking bolt is alternately moved radially outward from the disengaged positions shown in FIG. 1 through slot 110 along control bar 70, through its respective radial passage 112 on shaft 38, and into blocking contact with the slot of the corresponding forward drive gear.

Figure 7:
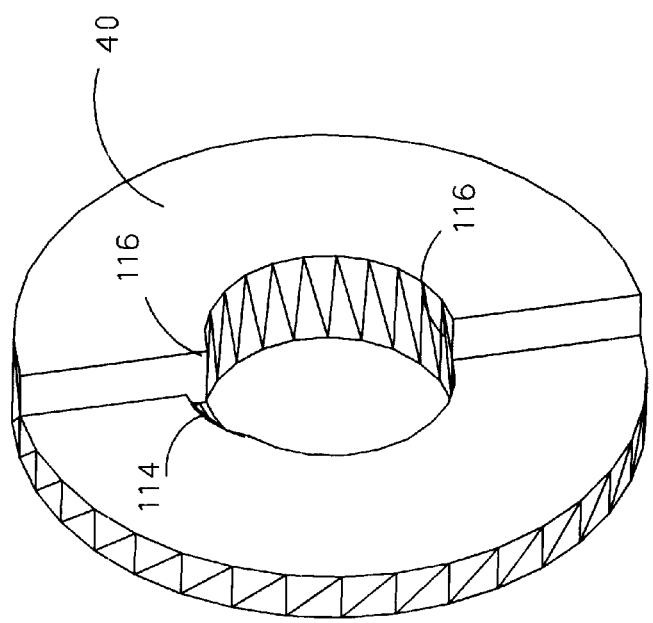
FIG. 7 is an isometric view of an output gear showing ramp surfaces on which the locking bolt moves on the gear.
Figure 6:
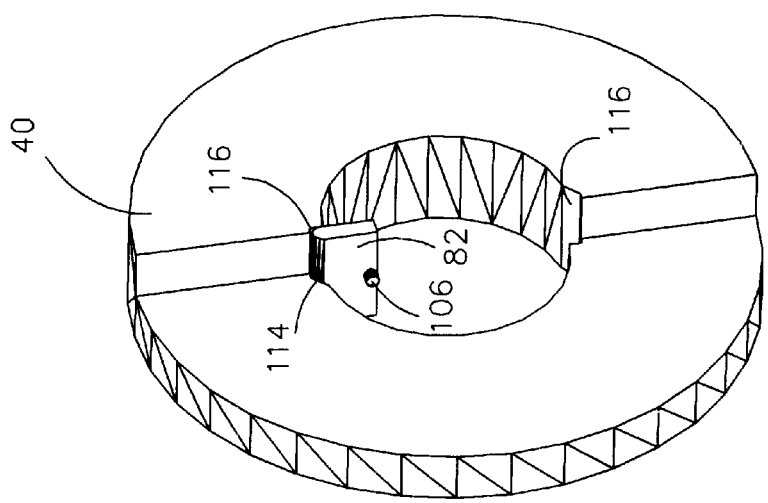
FIG. 6 is an isometric view showing a locking bolt driveably engaging a gear.
Figure 9:
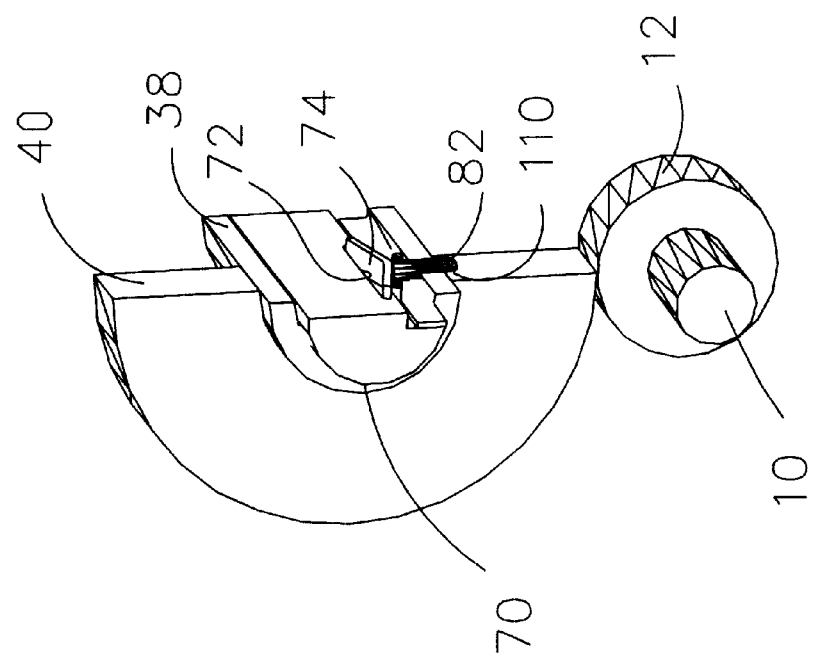
FIG. 9 is an isometric view of a gear-pinion pair with the locking bolt shown engaged with the gear control bar and output shaft.
Figure 8:
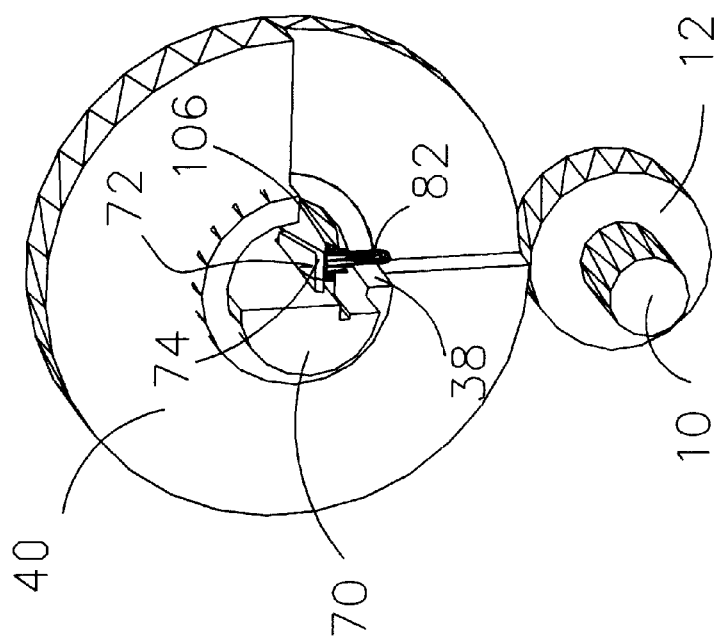
FIG. 8 is an isometric view of a pinion-gear pair showing a locking bolt driveably engaging the output shaft and gear, the gear shown partially in cross-section.
Figure 11:
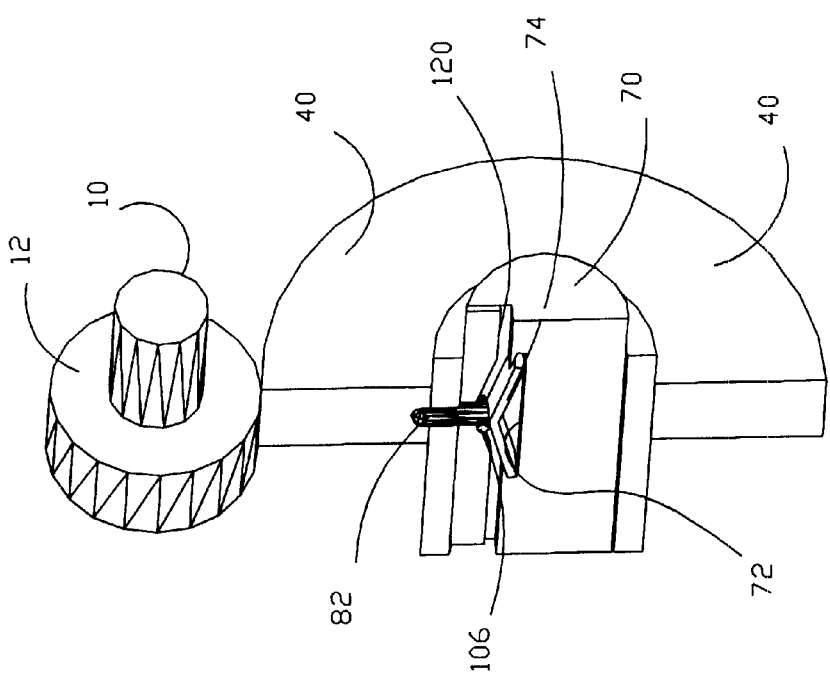
FIG. 11 is an isometric view showing a pinion meshing with a gear, partially in cross-section, and a locking bolt driveably connecting the gear and output shaft.
Figure 10:
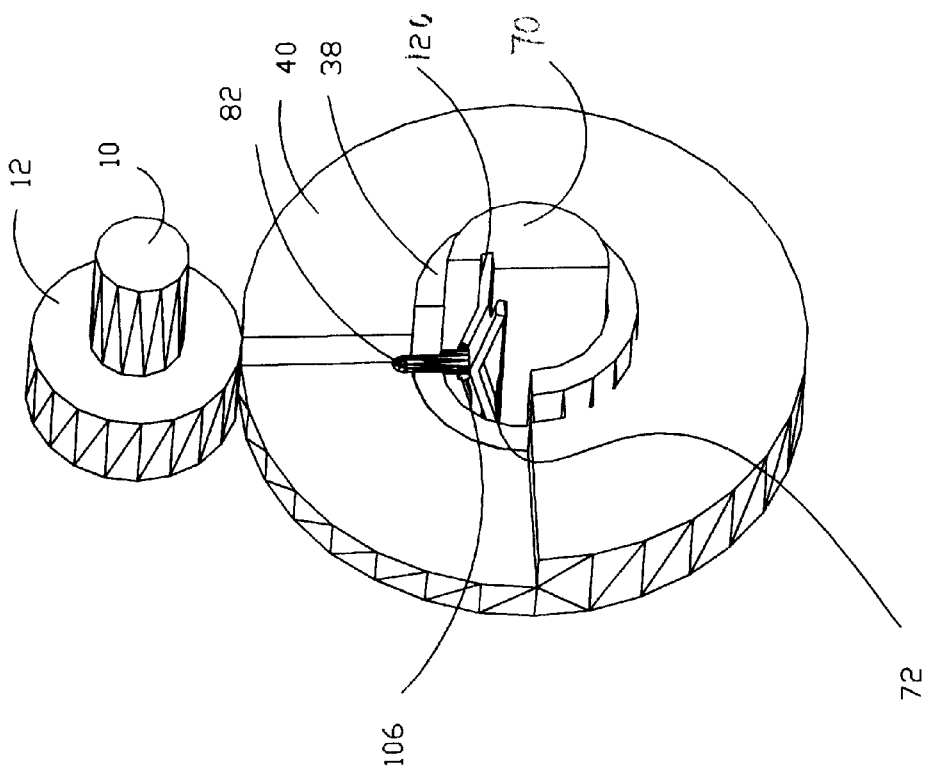
FIG. 10 is an isometric view of a gear-pinion pair with a locking bolt engaging the output shaft and gear.

FIGS. 6 and 7 show the first forward drive locking bolt 82, associated with the first forward drive ratio, contacting a blocking surface 116 on the drive gear 40. FIG. 7 shows that the inner surface of gear 40 is also formed with a ramp 114, on which the radially outer surface of locking bolt 82 contacts the gear and moves along the gear surface to a position of contact with surface 116. Ramp 114 facilitates engagement of the locking bolt 82 with stop surface 116 and disengagement therefrom. When the locking bolt 82 contact blocking surface 116, the gear is driveably engaged for rotation with shaft 38.

In accordance with this invention, each of the drive gears engaged by a locking bolt is formed at its inner surface with a ramp 114 and stop surface 116 so that each gear is alternately, selectively connected to the shaft 38.

Figure 2:
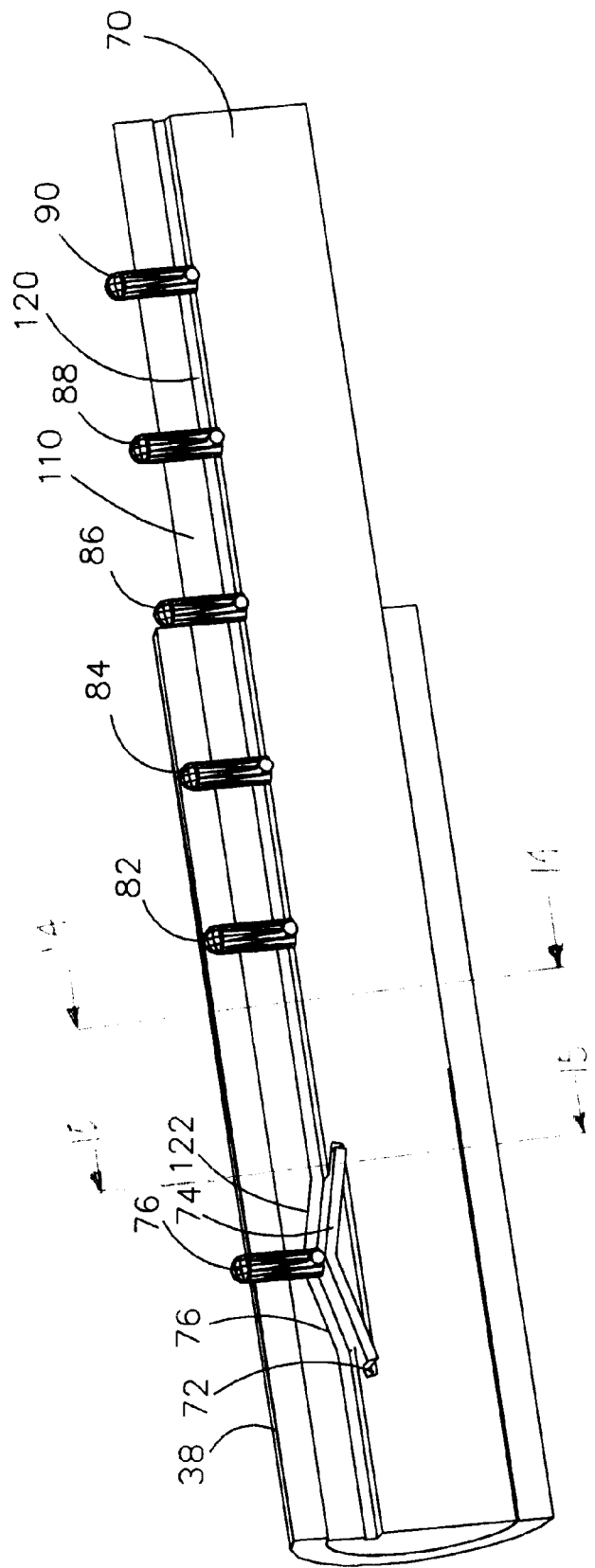
FIG. 2 is an isometric view showing an output shaft, a control bar assembly, and multiple locking bolts distributed axially along the control bar.
Figure 3:
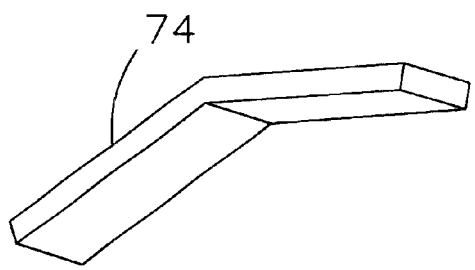
FIG. 3 is an isometric view of a spring plate for use in combination with the control bar and locking bolts.

Referring now to FIG. 2, control bar 70 is shown fitted within the axial bore of sleeve shaft 38 for axial sliding movement therein. Plate spring 74 is located in the recess 72, formed on the control bar 70, so that the spring plate can flex elastically and alternately move each of the locking bolts radially outward as the spring plate is brought into engagement with the locking bolts in response to axial displacement of control bar 70. FIG. 2 shows the reverse drive locking pin 76 extended radially outward on spring plate 74 through a radial passage 112 formed through the wall of shaft 38 in the vicinity of reverse drive gear 80. In this position locking bolt 76 driveably connects reverse gear 80 and shaft 38. In addition, the locking bolts 82–90 of the five lowest forward speed ratios are shown distributed axially along the axis of shaft 38 and control bar 70. In these positions, none of the forward gears is driveably connected to shaft 38, but each forward locking bolt is located in slot 110 of control bar 70 and retained in the respective radial passage 112 of shaft 38.

Figure 4:
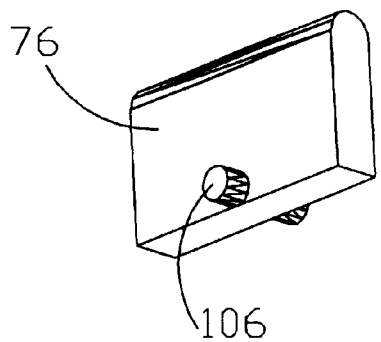
FIG. 4 is an isometric side view of a locking bolt and pin assembly.
Figure 5:
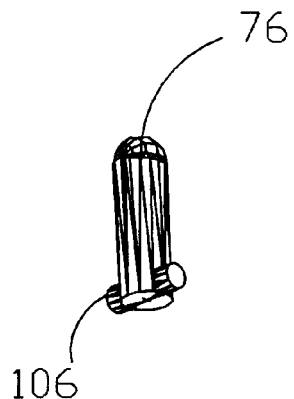
FIG. 5 is an isometric end view of a locking bolt and pin assembly.
Figure 14:
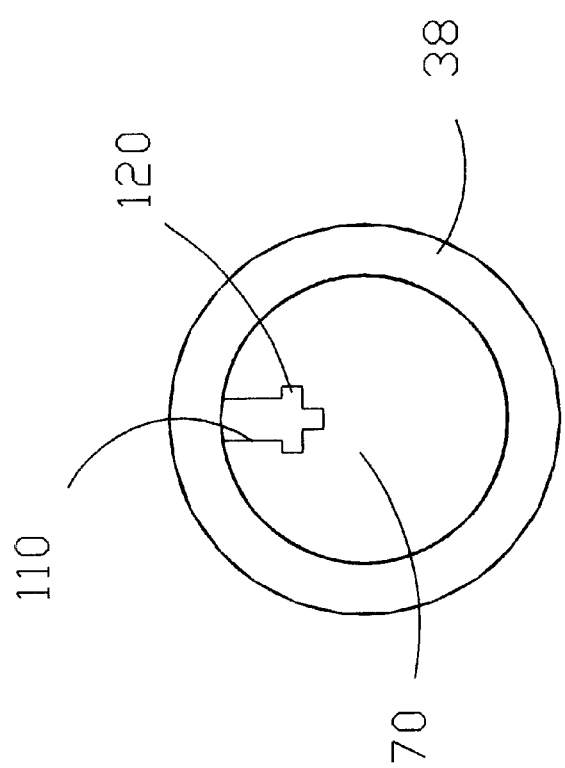
FIG. 14 is a cross section of the control bar and countershaft taken at plane 14—14 of FIG. 2.

FIGS. 4 and 5 show that each locking bolt 76, 82–104 is formed with a laterally extending follower pin 106 located at the radially inner end of the locking bolt. Each follower pin 106 is assembled in the transmission mechanism within an axially directed guide rail that includes an axially directed track 120 located on the control bar 70 radially inward from axial slot 110, as seen best in FIGS. 14 and 15. Axial track slot 120 extends linearly along the length of control bar 70, except in the vicinity of recess 72 and spring plate 74. There, track 120 locally parallels the contour of the spring plate, rising on an ascending ramp 122 and falling on a descending ramp 124 from its linear elevation elsewhere along the length of the control bar 70. The radial position of each locking bolt is determined by the axial position of control bar 70 as it moves relative to shaft 38 among the axial locations of the locking bolts. Contact between follower pin 106 and track 120 holds the locking pins in the disengaged position and limits the radial range of movement of each locking bolt as control bar 70 moves along shaft 38.

Each of the locking pins is continually located in its correct axial position for ready engagement with the corresponding gear due to its retention in the corresponding radial passage 112 of output shaft 38. As control bar 70 moves axially, axial slot 110 allows the control bar to move relative to the bolts and shaft 38.

Figure 15:
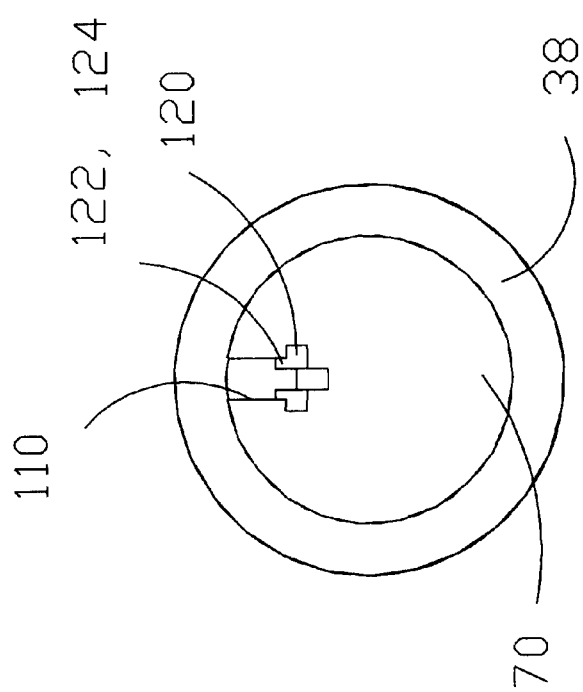
FIG. 15 is a cross section of the control bar and countershaft taken at plane 15—15 of FIG. 2.

FIG. 15 is a cross section through the control bar 70 and shaft 38 at the base of the ascending ramp 122 of slot 120. As a result of the system of interconnecting axial and radial slots, as the control bar moves axially toward a selected locking bolt, the radially inner surface of the locking bolt contacts the outer surface of the spring 74, pins 106 ascend the ramp 122 of track 120, and spring plate 74 urges the locking bolt radially outward through passage 112. As the locking bolt rises on the ascending ramp, it is forced radially outward through the passage 112 of shaft 38 and into contact with stop surface 116 on the selected gear. When control bar 70 is located at the position shown in FIG. 2 such that a locking bolt 76 is located at the apex of the ramps 122, 124 on the outer surface of spring 74, locking pin 76 becomes engaged with the gear, thereby producing a drive connection between the gear and output shaft 38.

As control bar 70 moves rightward to the next selected gear ratio position, locking bolt 76 is guided down the ramp 124 of track 120 due to contact between pins 106 and the descending ramp surface. This movement causes the locking bolt 76 to move to the disengaged position. When this action is completed, locking pin 76 is in the position of locking pins 82–90 as shown in FIG. 2, and the drive connection between the gear and shaft 34 is disengaged.

FIGS. 8–11 show the locking bolt 82 engaged with output gear 40 in several views, partially in cross-section.

FIG. 1 shows the reverse pinion 36 fixed to the cluster gear formed on input shaft 10, and reverse gear 80 journaled on the outer surface of output shaft 38, driveably fixed to the output shaft by locking bolt 76.

Figure 13:
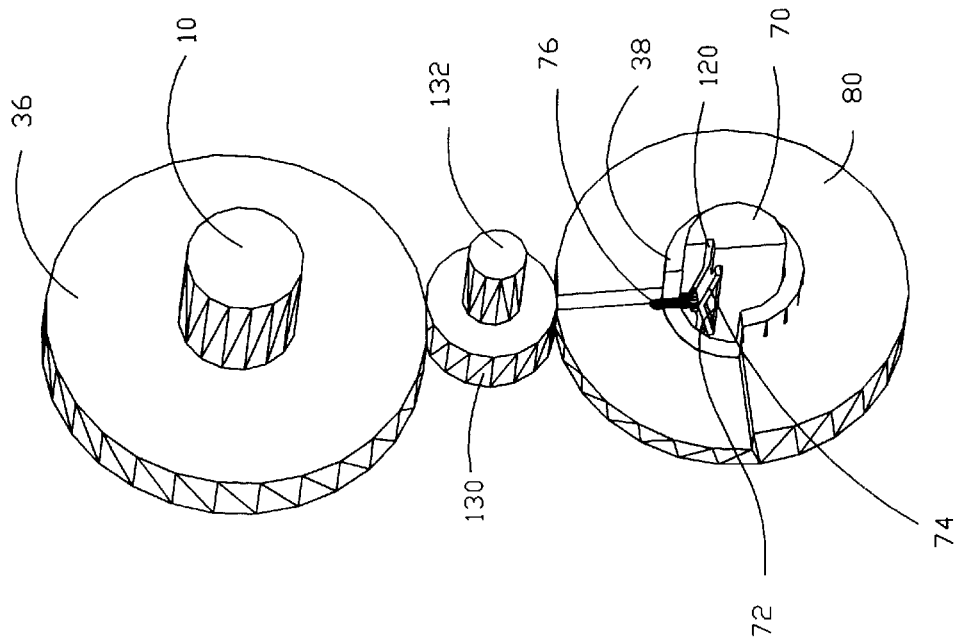
FIG. 13 is an isometric view showing a reverse drive gear mechanism according to the present invention.
Figure 12:
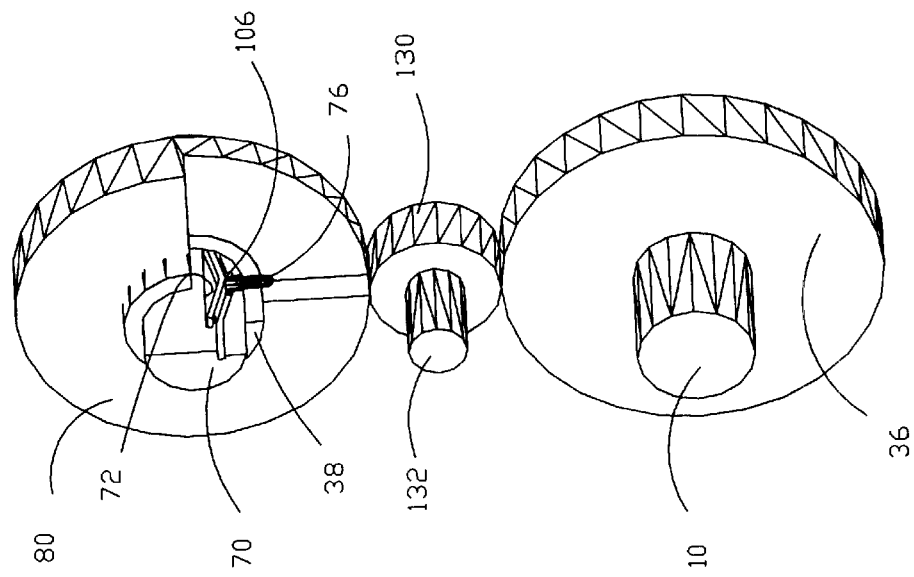
FIG. 12 shows a reverse drive gear mechanism according to the present invention.

FIGS. 12 and 13 show the reverse pinion 36, and reverse gear 80 in continuous meshing engagement with reverse idler gear 130. In operation, reverse drive results by moving control bar 70 axially leftward to the position shown in FIG. 1, thereby driveably connecting gear 80 to shaft 38. Idler gear 130 is rotatably supported on the gearbox for rotation on a stub shaft, which is journaled on the gearbox or supported there by bearings.

When the gear mechanism of this invention is used in an automotive vehicle, the optimal axial position of control bar 70 is determined preferably from a control algorithm whose input includes vehicle speed, the position of the engine throttle or another indication of commanded engine torque, the current operating speed ratio and the engine speed. The control algorithm produces as output the gear ratio by referencing the function with the input variables. The algorithm produces an electronic signal representing the commanded gear ratio. The signal is conditioned and applied as input to an electric solenoid, which moves control bar 70 axially to the position corresponding to the commanded gear ratio.

Alternatively, an operator can manually select the preferred gear ratio through manual control of a gear selector, which moves control bar 70 to the desired speed ratio position. Similarly, when the operator selects reverse drive, control bar 70 moves to the position of FIG. 1 so that the locking bolt 76 engages reverse output gear 80.

Figure 16:
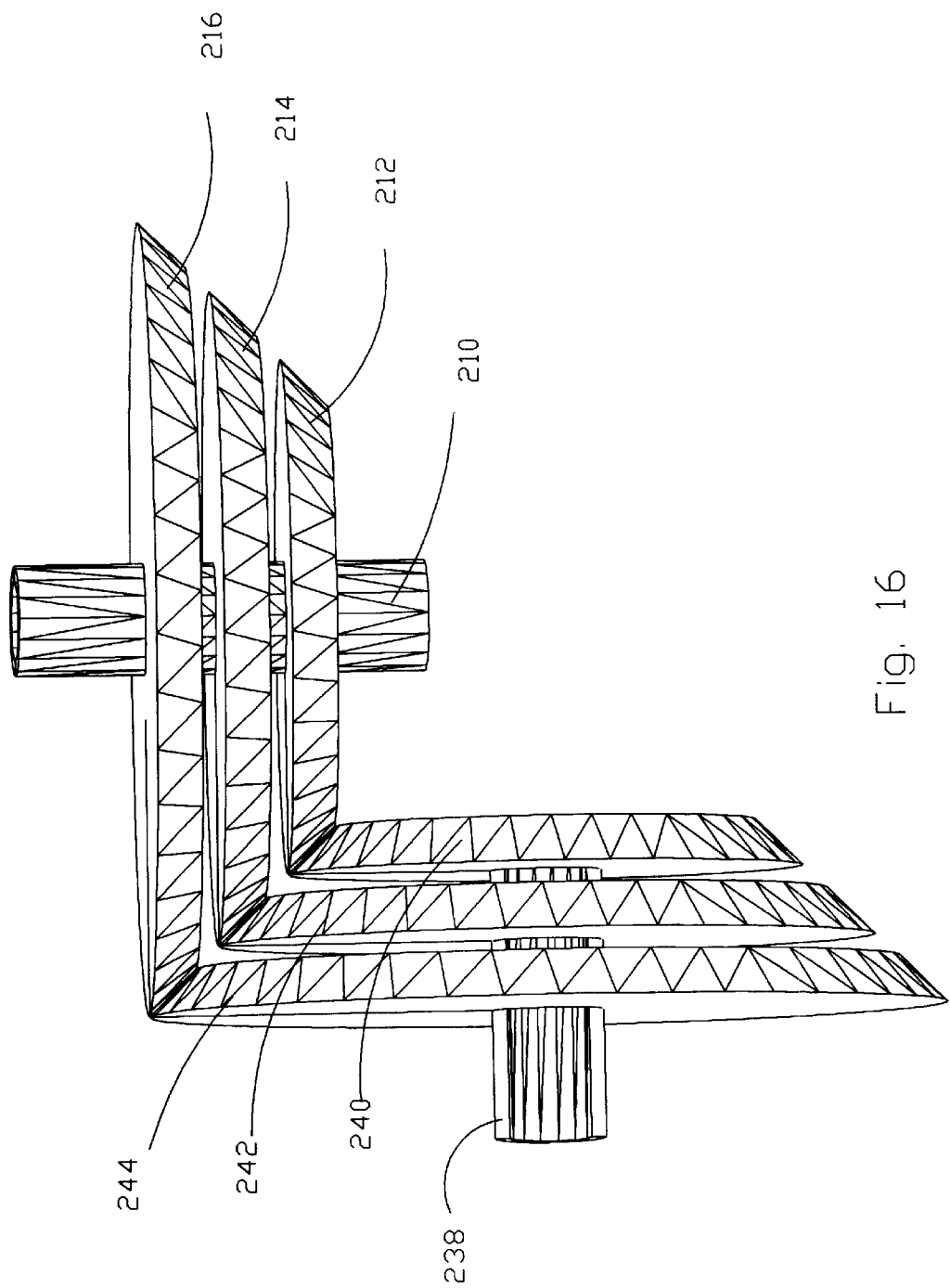
FIG. 16 is an side view showing an cluster gear shaft and output shaft arranged, the axes of the shafts being mutually perpendicular.

FIG. 16 shows shaft 210, which carries pinions 212, 214, 216 rotatably fixed to the shaft, and shaft 238, which carries gears 240, 242, 244 meshing with the pinions and journaled on the outer surface of shaft 238. The shafts are arranged substantially mutually perpendicular, instead of being arranged mutually parallel. A control bar and the mechanism of this invention operate as described above to engage and disengage selectively and alternately each gear and shaft 238.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A multiple speed transmission mechanism, comprising:
   a first shaft having multiple pinions mutually spaced along the shaft and fixed to the shaft for rotation therewith;
   a second shaft rotatably supporting multiple gears thereon, each gear in meshing engagement with a pinion, having multiple radially directed passages spaced mutually along the second shaft, each passage located at the location of a corresponding gear;
   a control bar supported for movement relative to the second shaft, having a guide rail including an axially directed track, an ascending tamp, and a descending ramp adjacent the ascending ramp;
   locking bolts, each locking bolt located in a passage and located in the guide rail for guided radial displacement in the passage in response to movement of the control bar relative to the second shaft; and
   a recess;
   a spring retained in the recess, adapted to urge alternately each locking bolt radially along a corresponding passage.

2. The mechanism of claim 1 wherein:
   a locking bolt includes a friction surface located for alternate frictional contact with a corresponding gear; and
   a corresponding gear includes a friction surface located adjacent a corresponding passage for contact with a locking bolt, whereby the gear is alternately driveably engaged with the second shaft due to such frictional contact and disengaged from the second shaft when such frictional contact is removed.

3. The mechanism of claim 1 wherein each locking bolt further comprises:
   a body portion located in a corresponding passage for radial displacement therein, adapted to driveably engage and disengage a corresponding gear;
   a follower fixed to the body portion, located in the guide rail and adapted to move alternately the locking bolts radially as the control bar moves relative to the second shaft, the follower adapted substantially to maintain the radial position of the body portion when the follower is located in the axial track, to move the body portion radially outward as the follower moves up the ascending ramp, and to move the body portion radially inward as the follower moves down the descending ramp.

4. The mechanism of claim 3 wherein the guide rail further comprises:
   a first recess having upper and lower radial surfaces extending along the control bar, located at a first lateral side of the guide rail;
   a second recess having upper and lower radial surfaces extending along the control bar, located at a second lateral side of the guide rail opposite the first lateral side; and
   the follower further comprises a pin extending from opposite lateral sides of the body portion, located within the first and second recesses, and adapted to guide alternate radial displacement of the locking bolts relative in the corresponding passages as the control bar moves relative to the second shaft.

5. The mechanism of claim 1 further comprising:
a reverse drive pinion rotatably supported on the first shaft;
a reverse drive gear rotatably supported on the second shaft;
a stub shaft; and
a reverse idler gear rotatably supported on the stub shaft in continuously meshing engagement with the reverse gear and reverse pinion.

6. The mechanism of claim 1 wherein each gear includes:
a stop surface located adjacent a corresponding passage and adapted for interference contact with a locking bolt, whereby each gear is alternately driveably engaged with the second shaft due to such contact and disengaged from the second shaft when such contact is removed.

7. The mechanism of claim 6 wherein each gear further includes a ramp surface located adjacent a corresponding passage, directed toward the stop surface, and adapted for contact with a corresponding locking bolt.

8. A multiple speed transmission mechanism, comprising:
an input shaft having multiple pinions, including a reverse drive pinion, mutually spaced along and fixed to the countershaft for rotation therewith;
a countershaft substantially parallel to the input shaft, rotatably supporting multiple gears thereon, including a reverse drive gear, each gear in meshing engagement with a pinion, having a bore extending along the countershaft and multiple radially directed passages spaced mutually along the countershaft, each passage located at the location of a corresponding gear;
a stub shaft;
a reverse idler gear rotatably supported on the stub shaft in continuously meshing engagement with the reverse gear and reverse pinion;
a control bar located in the bore, supported for movement relative to the second shaft, having a guide rail including an axially directed track, an ascending ramp, and a descending ramp adjacent the ascending ramp; and
locking bolts, each locking bolt located in a passage and located in the guide rail for guided radial displacement in the passage in response to movement of the control bar relative to the second shaft.

9. The mechanism of claim 8 wherein the control bar further includes:
a recess; and
a spring retained in the recess, adapted to urge alternately each locking bolt radially along a corresponding passage.

10. The mechanism of claim 8 wherein:
a locking bolt further comprises a friction surface located for frictional contact with a corresponding gear; and
a corresponding gear further comprises a friction surface located adjacent a corresponding passage for contact with a locking bolt, whereby the gear is alternately driveably engaged with the second shaft due to such frictional contact and disengaged from the second shaft when such frictional contact is removed.

11. The mechanism of claim 8 wherein each locking bolt further comprises:
a body portion located in a corresponding passage for radial movement therein, adapted to engage and disengage a corresponding gear;
a follower fixed to the body portion, located in the guide rail and adapted to move alternately the locking bolts radially as the control bar moves relative to the countershaft, the follower adapted substantially to maintain the radial position of the body portion when the follower is located in the axial track, to move the body portion radially outward as the follower moves up the ascending ramp, and to move the body portion radially inward as the follower moves down the descending ramp.

12. The mechanism of claim 11 wherein the guide rail further comprises:
a first recess having upper and lower radial 30 surfaces extending along the control bar, located at a first lateral side of the axial slot of the control bar;
a second recess having upper and lower radial surfaces extending along the control bar, located at a second lateral side of the axial slot of the control bar opposite the first lateral side; and
the follower further comprises a pin extending from opposite lateral sides of the body portion, located within the first and second recesses, and adapted to guide alternate radial movement of the locking belts relative in the corresponding passages as the control bar moves relative to the countershaft.

13. The mechanism of claim 8 wherein each gear includes:
a stop surface located adjacent a corresponding passage and adapted for contact with a locking bolt, whereby each gear is alternately driveably engaged with the countershaft due to such contact and disengaged from the second shaft when such contact is removed.

14. The mechanism of claim 13 wherein each gear further includes a ramp surface located adjacent a corresponding passage, directed toward the stop surface, and adapted for contact with a corresponding locking bolt.

15. A multiple speed transmission mechanism, comprising:
a first shaft having multiple pinions mutually spaced along the shaft and fixed to the shaft for rotation therewith;
a second shaft substantially perpendicular to 30 the first shaft, rotatably supporting multiple gears thereon, each gear in meshing engagement with a pinion, having multiple radially directed passages spaced mutually along the second shaft, each passage located at the location of a corresponding gear;
a control bar supported for movement relative to the second shaft, having a guide rail having an axially directed track, an ascending ramp, and a descending ramp adjacent the ascending ramp;
locking bolts, each locking bolt located in a passage, and located in the guide rail for guided radial displacement in the passage in response to movement of the control bar relative to the second shaft;
a recess; and
a spring retained in the recess, adapted to urge alternately each locking bolt radially along a corresponding passage.

16. The mechanism of claim 15 wherein:
a locking bolt includes a friction surface located for alternate frictional contact with a corresponding gear; and
a corresponding gear includes a friction surface located adjacent a corresponding passage for 25 contact with a locking bolt, whereby the gear is alternately driveably engaged with the second shaft due to such frictional contact and disengaged from the second shaft when such frictional contact is removed.

17. The mechanism of claim 15 wherein each locking bolt further comprises:
   a body portion located in a corresponding passage for radial displacement therein, adapted to driveably engage and disengage a corresponding gear;
   a follower fixed to the body portion, located 5 in the guide rail and adapted to move alternately the locking bolts radially as the control bar moves relative to the second shaft, the follower adapted substantially to maintain the radial position of the body portion when the follower is located in the axial track, to move the body portion radially outward as the follower moves up the ascending ramp, and to move the body portion radially inward as the follower moves down the descending ramp.

18. The mechanism of claim 15 wherein each gear includes:
   a stop surface located adjacent a corresponding passage and adapted for interference contact with a locking bolt, whereby each gear is alternately driveably engaged with the second shaft due to such contact and disengaged from the second shaft when such contact is removed.

\* \* \* \* \*